United States Patent Office 2,856,814
Patented Oct. 21, 1958

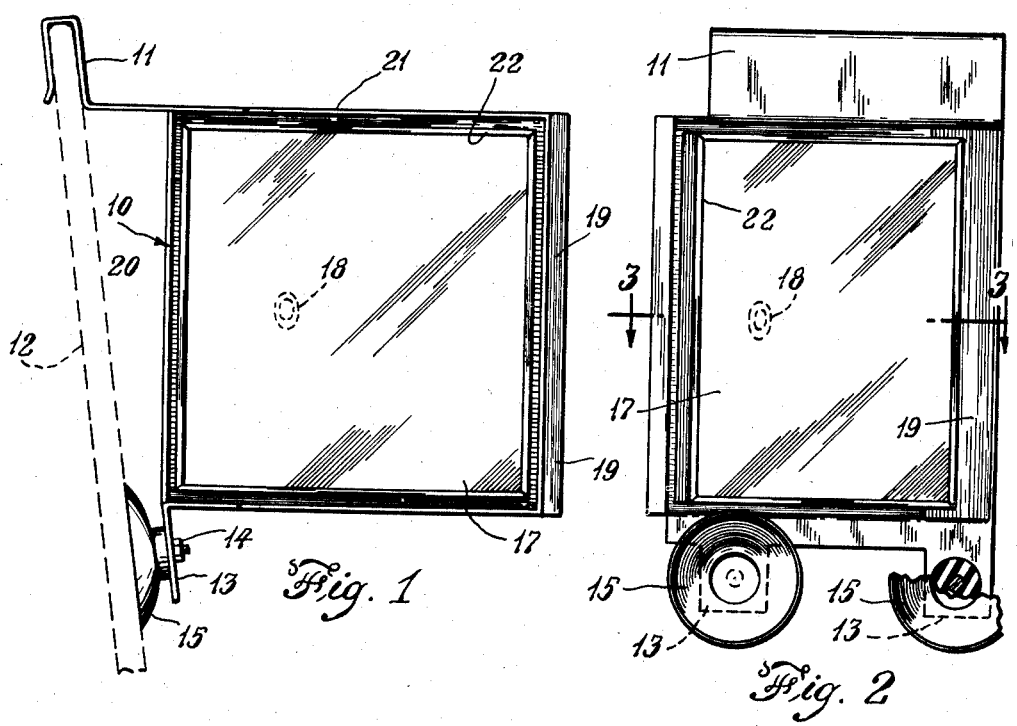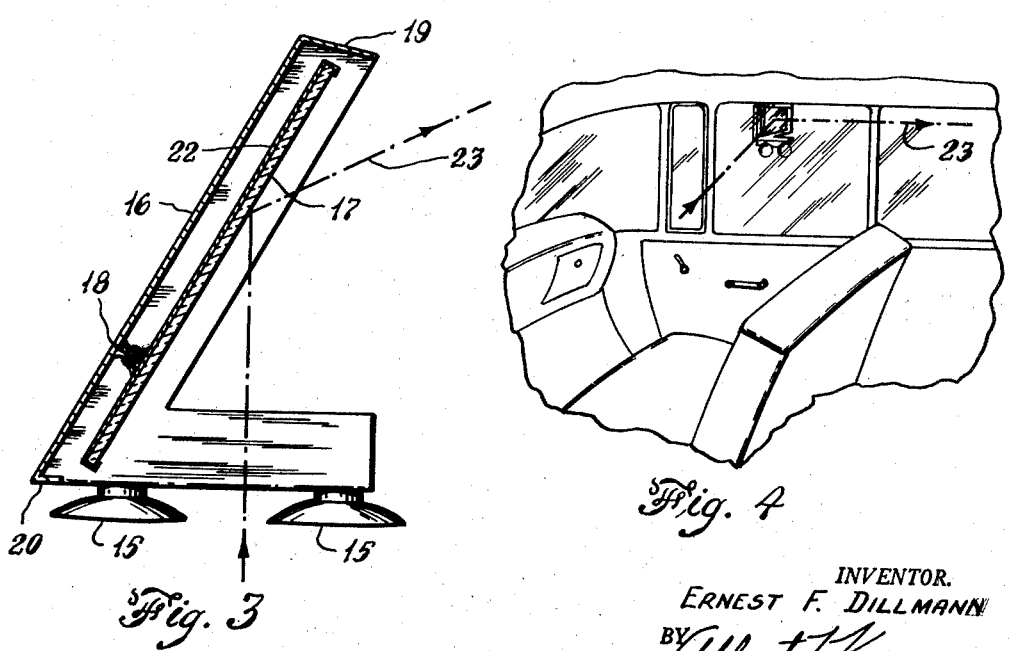

2,856,814

REAR VIEW MIRROR

Ernest F. Dillmann, Newark, N. J.

Application November 29, 1956, Serial No. 625,100

1 Claim. (Cl. 88—93)

This invention relates to vehicle rear view mirrors, and specifically to a rear view mirror for attachment to the right side of a vehicle.

Where rear view mirrors are employed on the right hand side of vehicles, it is customary to attach them to a fender or the body of the car. Such attachment frequently makes the mirror difficult to see from the driver's seat as a result of which little use is made of these devices. Owners of cars equipped with such rear view mirrors normally treat these devices more as ornaments than useful safety attachments.

Accordingly, it is an object of the present invention to provide a dependable rear view mirror for the right side of cars.

Another object of the present invention is to provide a rear view mirror which is inexpensive and may be secured to a vehicle with a minimum amount of difficulty.

A further object of the present invention is to provide a rear view mirror which is adaptable for use on all vehicles.

An object of the present invention is to provide a rear view mirror which may be seen easily from the driver's seat without obstructing the driver's vision to any great extent.

A feature of the present invention is its clip structure for easy attachment to the vehicle.

A further feature of the present invention is its use of positive locking suction cups to secure the mirror to the vehicle.

Another feature of the present invention is its compact size and simplified construction whereby adjustability of the device is maintained.

The invention consists of the construction, combination and arrangement of parts, as herein illustrated, described and claimed.

In the accompanying drawings, forming a part hereof is illustrated one form of embodiment of the invention, and in which:

Figure 1 is a view in rear elevation of the complete embodiment of the present invention.

Figure 2 is a view in front elevation of the rear view mirror device shown in Figure 1.

Figure 3 is a cross sectional view taken on line 3—3 in Figure 2, looking in the direction of the arrows.

Figure 4 is a somewhat pictorial view showing the interior of an automotive vehicle with the rear view mirror made in accordance with the present invention, attached thereto.

Referring to the drawings, particularly to Figure 1, 10 indicates a somewhat rectangularly shaped housing formed of metal, plastic, or some suitable material, having a clip member 11 secured to the top thereof. The clip member 11 is of a size and shape which will enable it to embrace the upper edge of a vehicle window, indicated by dashed lines at 12 in Figure 1. The clip 11 extends above the housing 10 so that the window may be closed completely without bringing the top of the housing 10 into contact with the frame of the window. The lower portion of the housing 10 is provided with downwardly extending flanges 13. Each flange 13 is suitably bored to receive therethrough a bolt 14 to which is attached a suction cup 15. Each of the flanges 13 is provided with an individual suction cup 15 for the purpose of grasping the window 12. It is also within the purview of the present invention to provide an elongated single suction cup (not shown) for this purpose. The clip 11 is angularly disposed with respect to the suction cup 15 as shown in Figure 1 for the purpose of mounting the housing 10 in a vertical position, in view of the fact that most vehicle windows slant inwardly towards the top. Individual modifications of the angle of slant of the clip may be provided depending upon the specific installation requirements.

The housing 10 is provided with a rearwardly extending wall structure 16, best shown in Figure 3. The wall structure 16 is angularly disposed with respect to the housing 10 and is adapted to receive thereon a flat mirror 17. The mirror may be carried by a frame 22. Pivotal mounting means such as the ball and socket shown at 18 in Figure 3, may be provided between the mirror frame 22 and the wall 16. By means of the pivotal mounting 18, the mirror 17 may be adjusted so as to reflect objects to the rear of the right hand side of the vehicle. The wall member 16 substantially encloses the mirror 17 on three sides by means of rearwardly edge extending portions 19, 20, and a top portion 21. The rearwardly extending members 19, 20 and 21, protect the mirror from snow, dirt, rain and the like while the mirror is in use. When the rear view mirror device is placed upon the vehicle as shown in Figure 1, it presents an appearance to the driver in accordance with the showing of Figure 2.

By referring to Figure 4, it will be seen that the driver will be able to see objects to the rear and right of his vehicle by sighting along the line of vision indicated by the dashed lines 23, and arrows in said figure.

The structure described herein may be used when the window is tightly closed as well as during various intermediate elevations of the window. If the window is run down quickly without thought of the mirror attached thereto the suction cups 15 will jam between the window and the frame of the window so as to prevent the window from being opened completely. It will be observed that were the window to be opened completely the rear view mirror device would be pulled from said mirror and might fall into the road. However, it has been ascertained that the suction cups are sufficiently strong and their grasp upon the surface of the window 12 is secure enough to prevent the accidental dislodgment of the present device of the vehicle.

Despite the secure hold that the present device has upon the window of the vehicle it is possible to remove the said rear view mirror and apply it to other vehicles as desired. Since the rear view mirror can be used at the top of the window as shown in Figure 4, it will interfere only slightly with the side vision of the driver and will not constitute a safety hazard.

From the foregoing it will be seen that there has been provided a simple, inexpensive, readily adaptable rear view mirror device for use in conjunction with the right hand window of the vehicle, which device will serve to appraise the driver of objects immediately to the rear of the right of the car.

Having thus fully described the invention, what is claimed as new and desired to be secured by Letters Patent of the United States is:

A rear view mirror for attachment to the right-hand window of a vehicle comprising, a substantially C-shaped housing member, a flanged portion depending from said housing, a suction cup carried by the flanged portion adjacent the bottom of said housing, a clip member secured to the top of the housing and extending upwardly of the housing and in the direction of the vehicle, said clip and suction cup elements being adapted to grasp the vehicle top and exterior surface respectively of the vehicle window, an outwardly extending wall structure carried by the housing at an angle with respect to the vehicle window, a pivotal mount secured to the rear surface of the wall and a mirror secured by the pivotal mount to the rear surface of the said wall structure.

References Cited in the file of this patent

UNITED STATES PATENTS

| | | |
|---|---|---|
| 918,724 | Austin | Apr. 20, 1909 |
| 948,113 | Moore | Feb. 1, 1910 |
| 968,068 | McClelland | Aug. 23, 1910 |
| 1,158,005 | Richards | Oct. 26, 1915 |
| 1,533,136 | Phelps | Apr. 14, 1925 |
| 1,757,280 | Withrow | May 6, 1930 |
| 1,800,218 | Janda | Apr. 14, 1931 |
| 2,091,203 | Hay | Aug. 24, 1937 |
| 2,351,087 | Welsh | June 13, 1944 |

FOREIGN PATENTS

| | | |
|---|---|---|
| 1,055,982 | France | Oct. 21, 1953 |